May 19, 1953

B. S. VILKOMERSON

TUNING AID FOR HIGH-FIDELITY RADIO RECEIVING SYSTEMS AND THE LIKE

Filed April 30, 1949

2,639,375

INVENTOR
BENJAMIN S. VILKOMERSON
BY H. H. Newton
ATTORNEY

Patented May 19, 1953 2,639,375

UNITED STATES PATENT OFFICE 2,639,375

TUNING AID FOR HIGH FIDELITY RADIO RECEIVING SYSTEMS AND THE LIKE

Benjamin S. Vilkomerson, Camden, N. J., assignor to Radio Corporation of America, a corporation of Delaware Application April 30, 1949, Serial No. 90,674

5 Claims. (Cl. 250—20)

Figure 1:
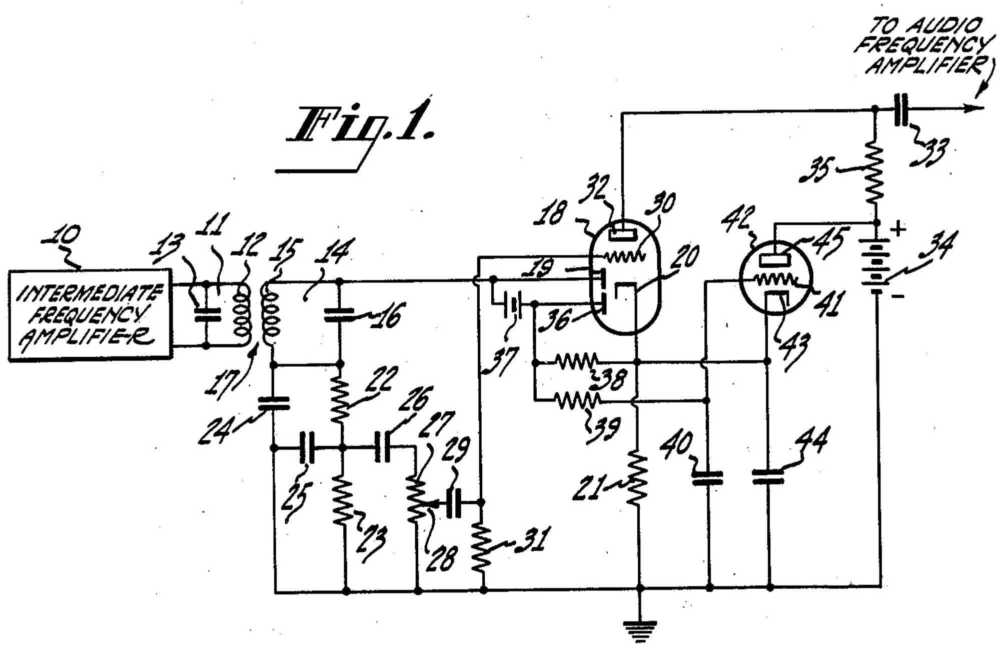

This invention relates to tunable high fidelity radio receiving system and the like, and has particular reference to improved signal-responsive tuning aids for facilitating the accurate tuning of such systems to selected signals.

Most radio receiving systems, such as used in broadcast and similar receivers at the present time, operate on the superheterodyne principle to select and to convert received signal-modulated radio frequency carrier waves into correspondingly modulated intermediate frequency carrier waves, whereby additional signal amplification may be effected with optimum efficiency before the intelligence signals are recovered from the carrier waves by a signal detector. In order that the sounds which are finally reproduced from the intelligence signals have the desired fidelity, it is necessary, among other things, to provide intermediate frequency signal amplifying stages having wide frequency pass bands. In order to produce the desired fixed intermediate frequency, it is necessary, in tuning the receiver, to properly adjust the frequency of a local oscillator. When the oscillator is adjusted to produce a frequency which can be combined with the received carrier wave frequency to produce exactly the predetermined intermediate frequency, the receiver will be tuned for optimum performance.

In order that the sound reproduction may be of high fidelity, it is necessary not only to provide amplification for a relatively wide band of signal frequencies, but also the frequency response of the amplifiers, such as the intermediate frequency amplifier, must be such that there is no material discrimination between any of the signal frequencies which it is desired to convert into sound effects. Consequently, such amplifiers, particularly for high fidelity modulated signal or broadcast reception, are designed to have what is known as substantially a flat response characteristic over the frequency pass band. Such a response characteristic generally provides a frequency vs. amplitude, or response, curve which is either flat-topped or double-peaked.

Generally, in tuning a radio receiver of the type described, the character of the reproduced sound is employed as an indication of proper tuning. Where the response characteristic of the signal amplifiers is relatively flat topped, it ordinarily is not easy to determine when the local oscillator is exactly tuned to produce the predetermined intermediate frequency solely on the basis of the amplitude of the reproduced sound. In many cases an approximation may be made on the basis of the quality of the reproduced sound. However, in the case of a high fidelity radio receiver having signal amplifiers providing wide-band frequency response, the point at which the receiver is exactly tuned is quite difficult to determine by such means. If the receiver is not properly tuned, there is encountered what is known as a side-band cutting, and also the receiver is subject to signal interference from adjacent channels.

It has previously been proposed to control some of the signal amplifiers, particularly the audio frequency amplifier, in such a manner as to change a condition of operation thereof, as by reducing the gain therethrough, or otherwise to render them inoperative in certain cases, except in response to the tuning of the radio receiver to substantial resonance with desired or selected incoming modulated signals or carrier waves. In many cases, such muting control of the signal channel has been used not so much for the purpose of ensuring exact tuning of the receiver to the selected carrier waves, but more for the purpose of minimizing noise signals otherwise normally reproduced when the receiver is being tuned from one signal channel or station to another. Such systems have been provided particularly in conjunction with automatic volume control facilities, the effect of which is to render the receiver extremely sensitive in the absence of strong received signals. Accordingly, when the receiver is tuned to a point between adjacent carrier channels, the sensitivity is increased so much that tube and other noise effects are unduly amplified and reproduced in considerable volume. Most systems which have been used for such purposes operate in response to the amplitude of the received signal effects. Accordingly, such systems are of no particular use for the purpose of determining exact tuning of the receiver, for the reason that the flat, double-peaked and similar response characteristics of the amplifiers render them incapable of making any substantial discrimination between different signal frequencies on the basis of their respective amplitudes.

It, therefore, is an object of the present invention to provide a tuning aid for radio receiving systems and the like by which to ensure in all cases, irrespective of relative signal strengths, a proper signal-selective adjustment of the system.

Another object of the invention is to provide a tuning aid for radio receiving systems and the like, by means of which a signal-amplifying portion of the system may be controlled in a desired manner, or rendered substantially unresponsive to received signals at all times except when the system is substantially exactly tuned to an incoming signal.

A further object of the invention is to provide a tuning aid for a radio receiver which includes a signal frequency-responsive muting system for a signal amplifier portion of the receiver, such as the audio frequency amplifier portion, which is responsive only to the signal frequency impressed thereon when the receiver is tuned for resonance with an incoming modulated carrier wave.

Still another object of the invention is to provide a muting system for an audio frequency signal amplifier which normally operates to maintain the amplifier in an unresponsive condition to any audio frequency signals impressed thereon, but which, in response to the tuning of the radio receiver to a predetermined carrier wave frequency, conditions the amplifier for operative response to audio signals.

A still further object of the invention is to provide a frequency-responsive muting system for an audio frequency signal amplifier wherein the amplifier, when conditioned for operation, functions entirely independently of the frequency characteristics of the muting control circuits.

In accordance with the present invention, there is provided a tuning aid adapted for use with high fidelity radio receiving systems and the like, in which a signal-amplifying portion of the system is rendered inoperative by gain-reducing or other means and is conditioned for normal operation by frequency-responsive means when the system is properly tuned to a selected signal. In one embodiment there is included an audio frequency amplifier having input and output circuits, together with means for impressing upon the input circuit audio frequency signals which it is desired to reproduce in amplified form in the output circuit. In addition, there is provided muting means coupled to the input circuit and normally operative to render the amplifier incapable of response to any audio signals impressed upon the input circuit. Finally, as a control system for the muting means, there is provided frequency-responsive means coupled to the source of the signal-modulated carrier waves and operative only in response to a predetermined carrier wave frequency for the purpose of rendering the muting means inoperative, whereby to condition the amplifier for response to the audio frequency signals impressed upon the input circuit thereof.

More particularly, the invention may readily be embodied in a signal receiving system wherein an audio frequency signal amplifier is provided with biasing or other gain control voltage which, when effective, biases the amplifier to or beyond cut-off. The source of biasing voltage may include a control tube circuit which is responsive to a predetermined intermediate frequency. When the radio receiver is tuned to produce the predetermined intermediate frequency, a frequency-responsive coupling circuit, which may utilize a piezoelectric crystal, is rendered conducting for signals in a relatively narrow band which are then utilized to effect the development of predetermined control voltages for the control tube which operates to reduce the amplifier biasing voltage to a point at which the amplifier is rendered responsive to the audio frequency signals impressed upon the input circuit thereof.

Figure 2:
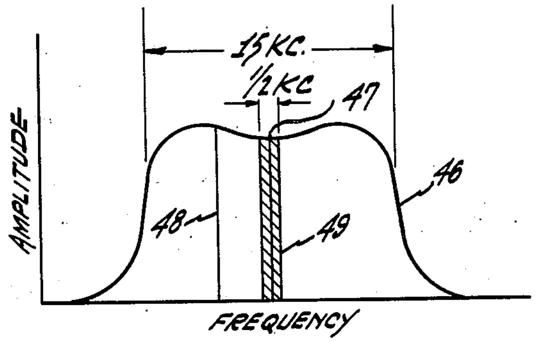

The novel features that are considered characteristic of this invention are set forth with particularity in the appended claims. The invention itself, however, both as to its organization and method of operation, as well as additional objects and advantages thereof, will best be understood from the following description taken in connection with the accompanying drawing, in which:

Figure 1 is a circuit diagram of that portion of a radio receiver embodying the present invention, and Figure 2 is a response curve of the intermediate frequency amplifier which may be used in a radio receiver embodying the instant invention.

Referring now to Figure 1 of the drawing, there is shown a source of signal-modulated carrier waves which, in the present instance, is represented by an intermediate frequency amplifier 10 which, in its output circuit, includes a resonant network 11 comprising the parallel arrangement of a coil 12 and a resonating capacitor 13, whereby the network is tuned for response to a predetermined intermediate frequency. A second resonant network 14, comprising a coil 15 inductively coupled to the coil 12 and shunted by a resonating capacitor 16, also is tuned for resonance at the predetermined intermediate frequency. The coils 12 and 15 form the primary and secondary windings, respectively, of an intermediate frequency transformer 17.

There also is provided an electron discharge device 18 which, for convenience, may be a duplex diode-triode which preferably is a high mu device such as the RCA type 6AT6. It is to be understood that the invention is not limited to the use of a tube having the triode and the two diodes in the same envelope. Any high mu triode may be used with a separate duplex-diode or with two separate diodes, for example. It is intended, therefore, that subsequent references to electronic devices of these characters as triodes and diodes be construed to include any of the aforementioned alternative forms. The high potential terminal of the secondary resonant network 14 is coupled to a diode anode 19 which, together with a common cathode 20, comprises the signal-demodulating tube or signal detector of a radio receiver. The cathode 20 is connected to ground through a biasing resistor 21 which, so far as the signal detector is concerned, is of no particular importance. The load circuit for the signal detector includes the series arrangement of resistors 22 and 23 coupled between the low potential terminal of the secondary resonant network 14 and ground. This terminal also is maintained at ground potential for carrier wave frequencies by means of a capacitor 24. The junction point between the signal detector load resistors 22 and 23 is bypassed to ground for carrier wave frequencies by a capacitor 25 and is coupled by a capacitor 26 to a volume control device 27. The sliding contact 28 of the volume control device is coupled by means of a capacitor 29 to the control grid 30 of the triode section of the tube 18 which functions as a signal-amplifying tube, or more particularly as the first stage of an audio frequency signal amplifier. A leak resistor 31 is coupled between the control grid 30 and ground. The anode 32 of the tube 18 may be conventionally coupled, such as by a capacitor 33, to further audio frequency amplifier stages. Space current for the triode section of the tube 18 is supplied from a source of unidirectional energy such as a battery 34, the negative terminal of which is grounded and the positive terminal of which is coupled to the anode 32 through a load resistor 35.

The tube 18 also is provided with another diode anode 36 which is coupled to the high potential terminal of the secondary resonant network 14 by a resonant device or resonator such as a piezoelectric crystal 37. The frequency characteristics of the crystal should be so chosen that it will respond only to the impression thereon of a predetermined frequency which, in the present instance, should be the center frequency of the intermediate frequency pass band. The diode formed by the anode 36 and the common cathode 20 constitutes a carrier wave-rectifying tube and is provided with a load circuit consisting of a resistor 38. The anode 36 also is coupled, through a filter network including a series resistor 39 and a shunt capacitor 40, to the control grid 41 of a control electron discharge device such as the triode tube 42 functioning as a biasing voltage-developing tube. This tube preferably is a low mu device such as the RCA type 6C4. The filter including the resistor 39 and the capacitor 40 is for the purpose of removing the audio frequency signal components from the voltage developed in the rectifying diode load resistor 38, so that there is impressed upon the control grid 41 a unidirectional voltage, the amplitude of which is independent of the instantaneous values of the audio signals. The cathode 43 of the tube 42 is coupled to the common cathode 20 of the tube 18, and thence through the biasing resistor 21 to ground. The common cathode biasing resistor 21 is bypassed for alternating currents by a capacitor 44. The anode 45 of the tube 42 is coupled directly to the positive terminal of the battery 34 by which the tube is supplied with space current.

The following description of the operation of the system embodying the present invention will better be understood by having additional reference ot Figure 2 of the drawing. There is shown a curve 46 representing the response of the intermediate frequency amplifier over the band of frequencies which it is designed to pass. As will be seen, the curve 46 is of the double-peaked type and has a relatively flat response over a substantial band of frequencies which, for the present illustrative purpose, will be assumed to be of the order of 15 kilocycles. The response curve 46 also will be observed to be substantially symmetrical about the center intermediate frequency 47.

Assume that, in the first instance, the local oscillator (not shown) is adjusted so that, when the frequency output thereof is combined with the received carrier waves, the intermediate frequency so produced is at one side or the other of the center intermediate frequency represented by the vertical line 47 of Figure 2. For example, assume that the intermediate frequency produced by the mistuning of the local oscillator is represented by the vertical line 48. It will be seen that, at this frequency, response by the intermediate frequency amplifier is substantially at a maximum. The signal-modulated intermediate frequency carrier waves impressed upon the signal detector including the anode 19, therefore, have a maximum amplitude. However, by reason of the operation of the system embodying the present invention, no response by the sound reproducing facilities is produced by these signal effects.

This may be seen by considering that, at this time, the biasing voltage developing tube 42 is so controlled that it is conducting space current of considerable magnitude. This current, in traversing the biasing resistor 21, develops at the cathode 20 of the tube 18 a voltage of positive polarity relative to ground and of sufficient magnitude to bias the triode signal-amplifying section of the tube 18 beyond the point of space current cut-off. At the same time, in the illustrative embodiment of the invention where the cathode 20 is associated not only with the triode section of the tube 18 but also with the diode anode 19, this positive voltage also effectively biases the diode 19—20 so that it will not respond to any signal effects impressed thereon. It will be appreciated that these conditions obtain by reason of the fact that, at the assumed frequency represented by the line 48 of Figure 2, the crystal 37 is completely unresponsive. It is responsive only to those frequencies lying within the relatively narrow band represented by the shaded area 49 at the center of which is the center intermediate frequency 47. Under these conditions the rectifying diode 36—20 is non-conducting and there is no voltage developed in the load resistor 38.

As the adjustment of the local oscillator is changed to produce an intermediate frequency which lies within the range represented by the shaded area 49 of Figure 2, which may conveniently be made equal substantially to ½ kilocycle, the crystal 37 responds and becomes a relatively low impedance device coupling the anode 36 to the network 14, whereby to impress the signal-modulated intermediate frequency carrier wave energy developed at the high potential terminal of the secondary resonant network 14 upon the anode 36. The carrier wave-rectifying diode 36—20 thereby becomes conducting to develop a unidirectional voltage in its load resistor 38. This voltage, after the filter 39—40 functions to remove therefrom the audio frequency components, is impressed in negative polarity upon the control grid 41 of the biasing voltage-developing tube 42. In response to the impression of the first increment of this voltage upon the control grid 41, space current conduction in the tube 42 is decreased, thereby effecting a corresponding incremental decrease in the magnitude of the positive voltage developed in the biasing resistor 21. Thus, whatever biasing effect that the impression of this positive voltage upon the cathode 20 of the tube 18 has upon the operation of the rectifying diode 36—20 is decreased, thereby further increasing the conductivity of this diode. The operation of the system, accordingly, is seen to be cumulative so that there is produced what is effectively a trigger action, the result of which is to reduce substantially instantaneously the biasing voltage at the cathode 20 to an ineffective magnitude. The diode 19—20 thereby becomes responsive to the signal-modulated carrier waves impressed thereon from the resonant network 14 to develop demodulated signal effects in the load resistors 22 and 23. Also, at the same time the triode section of the tube 18 is rendered responsive to amplify the demodulated signal effects impressed upon the control grid 30 from the load resistors 22 and 23. In this manner the radio receeiver may be quite accurately tuned for response to a selected radio frequency carrier wave.

It will be appreciatetd that the crystal 37 may be selected so as to restrict its response to such a narrow band of intermediate frequencies that it will be effective to disable or mute the audio frequency signal amplifier at all times except when the receiver is tuned to produce an intermediate frequency within the response band of the crystal. It also will be appreciated that, once having adjusted the frequency of the local oscillator to produce an intermediate frequency lying within the response range of the crystal 37, the amplifying system operates in an entirely conventional manner. For example, the pass band of frequencies, which is demodulated by the signal detector diode 19—20, is determined principally by the characteristics of circuits other than that including the crystal 37, such as, for example, the primary and secondary resonant networks 11 and and 14 of the intermediate frequency transformer 17.

The behavior of the receiver is comparable to one which is extremely selective, but yet, once it is properly tuned, it has whatever characteristics may be desired to reproduce an audio signal with optimum fidelity. By the use of such a device as that provided by the instant invention, side-band cutting, whereby signal distortion affecting quality of the reproduced sounds is produced, may be entirely eliminated. Also, any signal interference from adjacent channels, which is encountered frequently in a radio receiver as a result of mistuning, may be completely eliminated.

It will be obvious to those skilled in the art that the present invention is susceptible of embodiment in forms other than that specifically shown herein for purposes of illustration. As already indicated, the tube 18 may be replaced by separate tubes, one of which being a high mu triode and the other of which being either a duplex diode or two separate diodes. In the event that it is desired to use separate tubes, they may be interconnected substantially as shown herein; that is, with the cathodes all connected together so that, as far as the external circuits are concerned, they will function substantially as the common cathode 20. However, it also will be appreciated that it is not essential that the cathode cooperating with the signal demodulating rectifier such as 19—20 and the cathode associated with the triode signal amplifier both be biased by means of the voltage developed in the biasing resistor 21. It may be desirable only to bias the signal-demodulating rectifier so as to render it unresponsive to signal-modulated carrier waves impressed thereon from the resonant circuit 14 until the receiver is accurately tuned to render the rectifying diode operative, whereby to remove the bias from the demodulating diode. Alternatively, the cathode associated with the signal amplifying triode only may be biased so as to render this tube unresponsive to any signals which may be impressed thereon from the demodulating diode load circuit resistors 22 and 23. In either case, the audio signal-amplifying system is completely unresponsive until the receiver is accurately tuned. Furthermore, the system will operate in an entirely satisfactory manner if the cathode associated with the rectifying diode is not subject to the biasing voltage developed by the tube 42. In such a case the trigger action resulting from the circuit arrangement shown and described herein will not be as pronounced. However, for all practical purposes the audio signal-amplifying system will be rendered operative substantially instantaneously as soon as the receiver is accurately tuned substantially to the center intermediate frequency.

Also, it will be evident that the invention is not limited to embodiments thereof including a piezoelectric crystal as the frequency-responsive means by which the muting circuit of the audio signal amplifier is rendered inoperative, whereby to condition the amplifying system for response to the audio signals. Other resonant bodies, such as magnetostrictive devices, may be used with substantially equal facility without departing from the spirit of the invention. Also, it is considered to be within the scope of the invention to utilize for such a purpose a frequency-responsive network such as a narrow band pass filter, for example. The only essential requirements are that the means employed for such a purpose be rather critically responsive to a predetermined relatively narrow band of frequencies and that, in response to such frequencies, it be capable of coupling the rectifying diode to the source of the signal-modulated carrier waves.

What is claimed is:

1. A tuning aid adapted for use with high fidelity radio receiving systems and the like, comprising a singe tuned signal input circuit responsive to signal-modulated carrier waves covering a relatively wide band of freqencies, an electronic signal-demodulating tube coupled to said signal input circuit and having an output circuit in which to develop said signals, an electronic signal-amplifying tube having an input circuit and a cathode circuit coupled to said output circuit, an electronic carrier wave-rectifying tube having an output circuit, an electronic biasing voltage-developing tube having an input circuit coupled to the output circuit of said rectifying tube and an output circuit in which to develop said biasing voltage coupled to the input circuit of said amplifying tube, and a circuit including a piezoelectric crystal resonant and effective only at a predetermined carrier wave frequency connected between one terminal of said signal input circuit and said rectifying tube to couple said rectifying tube to said signal input circuit.

2. A tuning aid adapted for use in high fidelity radio receiving systems and the like, comprising a single tuned signal input circuit responsive to signal-modulated carrier waves, signal-demodulating means including a first diode and a first load impedance device therefor coupled to said signal input circuit, signal-amplifying means including a triode having a cathode and a space current-controlling electrode coupled to said first load impedance device, a biasing impedance device connected to said cathode, carrier wave-rectifying means including a second diode and a second load impedance device therefor, biasing voltage-developing means including a second triode having a space current-controlling electrode coupled to said second load impedance device and a cathode connected to the cathode of said first mentioned triode, and means including a piezoelectric crystal resonant at a predetermined carrier wave frequency and connected between said first diode and said carrier wave-rectifying means to effectively couple said signal input circuit only at said predetermined frequency.

3. A tuning aid adapted for use in high fidelity radio receiving systems and the like, comprising a single tuned signal input circuit responsive to signal-modulated wide band intermediate frequency carrier waves, a signal-detecting diode and a load circuit resistor therefor coupled to said signal input circuit, a signal-amplifying triode having a cathode and a control grid coupled to said signal-detecting diode load resistor, a biasing resistor for said triode connected to said cathode, a carrier wave-rectifying diode and a load resistor therefor, a biasing voltage control triode having a grid coupled to said carrier wave-rectifying diode load resistor and a cathode connected to said first mentioned triode circuit, and a piezoelectric crystal resonant at said intermediate frequency connected between said signal input circuit and said last named diode for coupling said carrier wave-rectifying device to said signal input circuit only at said intermediate frequency.

4. A control system for signal amplifiers comprising a source of signal modulated carrier waves in a predetermined band of frequencies, demodulating means coupled to said carrier wave source, a modulation signal amplifier having an anode and cathode and an input circuit connected with said demodulating means to receive the signal output therefrom, voltage supply means for supplying a biasing voltage connected with said amplifier input circuit, said voltage supply means comprising an electron tube having an anode and cathode connected respectively to the anode and cathode of said amplifier, a rectifier for controlling the biasing voltage applied to said amplifier from said supply means, said rectifier connected between said biasing voltage supply means and said source of carrier waves, said biasing voltage from said supply means being connected with said rectifier to render said amplifier and said rectifier inoperative to conduct signals, means responsive to a predetermined center frequency within said band of frequencies connected between said rectifier and said source of carrier-waves to control said biasing voltage in a direction to render said amplifier operative and responsive to signals at said predetermined center carrier-wave frequency.

5. A control system for signal amplifiers comprising a source of signal modulated carrier waves in a predetermined band of frequencies, means coupled to said carrier wave source for demodulating said carrier waves, a modulation signal amplifier having an anode and cathode and an input circuit connected with said demodulating means to amplify signals therefrom, voltage supply means for supplying a biasing voltage connected with said amplifier input circuit, said voltage supply means comprising an electron tube having an anode and cathode connected respectively to the anode and cathode of said amplifier, and a rectifier for controlling said biasing voltage connected between said biasing voltage supply means and said source of carrier waves, said biasing voltage from said supply means being connected with said rectifier and said demodulating means to render said amplifier and said rectifier and said demodulating means inoperative to conduct signals, means responsive to the center frequency within said band of frequencies connected between said rectifier and said source of carrier waves to control said bias voltage source, whereby said amplifier is rendered responsive to signals at said carrier-wave center frequency.

BENJAMIN S. VILKOMERSON.

References Cited in the file of this patent

UNITED STATES PATENTS

| Number | Name | Date |
|---|---|---|
| 2,096,874 | Beers | Oct. 26, 1937 |
| 2,115,871 | Pitsch | May 3, 1938 |
| 2,250,596 | Mountjoy | July 29, 1941 |

FOREIGN PATENTS

| Number | Country | Date |
|---|---|---|
| 422,858 | Great Britain | Jan. 21, 1935 |
| 425,412 | Great Britain | Mar. 11, 1935 |
| 443,956 | Great Britain | Mar. 10, 1936 |
| 461,966 | Great Britain | Feb. 22, 1937 |